United States Patent
Imai et al.

(10) Patent No.: US 11,807,525 B2
(45) Date of Patent: Nov. 7, 2023

(54) ACTIVATED CARBON FIBER SHEET FOR MOTOR VEHICLE CANISTER

(71) Applicant: NIPPON PAPER INDUSTRIES CO., LTD., Tokyo (JP)

(72) Inventors: Daisuke Imai, Tokyo (JP); Yoshihide Watanabe, Tokyo (JP); Yuu Takata, Tokyo (JP); Shunsuke Ozawa, Tokyo (JP); Chie Yoshida, Tokyo (JP); Kenichi Fujino, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 553 days.

(21) Appl. No.: 17/123,839

(22) Filed: Dec. 16, 2020

(65) Prior Publication Data

US 2021/0198111 A1 Jul. 1, 2021

Related U.S. Application Data

(63) Continuation of application No. PCT/JP2019/022296, filed on Jun. 5, 2019.

(30) Foreign Application Priority Data

Jun. 19, 2018 (JP) ................... 2018-115823
Jan. 24, 2019 (JP) ................... 2019-009959

(51) Int. Cl.
*C01B 32/318* (2017.01)
*F02M 25/08* (2006.01)

(52) U.S. Cl.
CPC ....... *C01B 32/318* (2017.08); *F02M 25/0854* (2013.01); *C01P 2006/10* (2013.01); *C01P 2006/12* (2013.01); *C01P 2006/14* (2013.01); *C01P 2006/16* (2013.01)

(58) Field of Classification Search
CPC ... C01B 32/318; C01B 32/306; C01B 32/336; C01B 32/354; C01B 32/30; C01B 32/312; F02M 25/0854; F02M 25/08; C01P 2006/10; C01P 2006/12; C01P 2006/14; C01P 2006/16; C01P 2006/90; B01J 2220/4825; B01J 20/28011; B01J 20/28038; B01J 20/28066; B01J 20/28069; B01J 20/2808; B01J 20/3078; B01J 20/3085; B01J 27/02; B01J 27/14; B01J 35/06; B01J 20/20; B01J 20/28; B01J 20/30; B01J 27/16; B01J 35/10; B01J 37/08; D01F 9/16

See application file for complete search history.

(56) References Cited

U.S. PATENT DOCUMENTS 6,120,841 A * 9/2000 Parmentier ............. D01F 9/16
427/382
2006/0141256 A1 6/2006 Ishikawa et al.
2010/0212496 A1 8/2010 Hanamoto et al.

FOREIGN PATENT DOCUMENTS

| JP | 55-107056 | | 8/1980 | |
|----|-----------|---|--------|---|
| JP | 57-71620 | | 5/1982 | |
| JP | 5-103979 | * | 4/1993 | ............. B01J 20/20 |
| JP | 2001-240407 | * | 9/2001 | ............. C01B 31/10 |
| JP | 2011-83693 | | 4/2011 | |
| JP | 2013-173137 | | 9/2013 | |
| WO | 2004/110928 | | 12/2004 | |

OTHER PUBLICATIONS

Written Opinion the International Search Authority (ISA) in PCT/JP2019/022296 (Year: 2019).*
Office Action dated Oct. 11, 2022 in Korean Patent Application No. 10-2021-7001381, with English language translation.
Kunquan Li et al., "Kinetics and mechanism studies of p-nitroaniline adsorption on activated carbon fibers prepared from cotton stalk by NH4H2PO4 activation and subsequent gasification with steam", Journal of Hazardous Materials, vol. 178, pp. 553-559, 2010.
Japanese Office Action dated Apr. 23, 2019, issued in corresponding Japanese Patent Application No. 2019-009959, with English language translation.
Taiwanese Search Report dated Dec. 18, 2019, issued in corresponding Taiwanese Patent Application No. 108119394.
Taiwanese Office Action dated Dec. 18, 2019, issued in corresponding Taiwanese patent application No. 108119394, with English language translation.
International Search Report, dated Jul. 9, 2019 in corresponding International Patent Application No. PCT/JP2019/022296, with English language translation.
Extended European Search Report dated Jun. 20, 2022 in corresponding European Patent Application No. 19822974.2.

* cited by examiner

*Primary Examiner* — Daniel C. McCracken
(74) *Attorney, Agent, or Firm* — WENDEROTH, LIND & PONACK, L.L.P.

(57) ABSTRACT

An object of the present invention is to provide a new form of adsorbent suitable for a motor vehicle canister. An activated carbon fiber sheet satisfies one or two or more of conditions for indices, such as a specific surface area, a pore volume of pores having a given pore diameter, and a sheet density. An embodiment, for example, may have: a specific surface area ranging from 1400 to 2200 $m^2/g$; a pore volume ranging from 0.20 to 1.20 $cm^3/g$ for pores having pore diameters of more than 0.7 nm and 2.0 nm or less; and a sheet density ranging from 0.030 to 0.200 $g/cm^3$.

9 Claims, No Drawings

ACTIVATED CARBON FIBER SHEET FOR MOTOR VEHICLE CANISTER

CROSS-REFERENCE TO RELATED APPLICATIONS

This application is based upon and claims the benefits of priorities from Japanese Patent Application No. 2018-115823, filed Jun. 19, 2018; Japanese Patent Application No. 2019-009959, filed Jan. 24, 2019; and International Application No. PCT/JP2019/022296, filed Jun. 5, 2019, the entire contents of which are incorporated herein by reference.

TECHNICAL FIELD

The present invention relates to activated carbon fiber sheets and particularly relates to activated carbon fiber sheets suitable for use in motor vehicle canisters.

BACKGROUND ART

Gasoline-powered vehicles release fuel vapor that has filled their fuel tanks due to change of pressure in the fuel tanks with changes, such as changes in outside air temperature. The released fuel vapor is considered to be one of substances causing PM2.5 or photochemical smog. Canisters including adsorbents, such as activated carbon, have been provided to prevent the release of the fuel vapor into the atmosphere. (Hereinafter, in this Description, a canister mounted in a motor vehicle may simply be referred to as a "motor vehicle canister" or more simply a "canister.")

With the recent increase in awareness for environmental conservation, gas emission regulations tend to be tightened year by year, and there is thus a demand for canisters to have higher adsorption performance. In addition, intake performance of motor vehicles tends to be reduced due to the spread of systems including start-stop systems, and gasoline adsorbed by adsorbents in their canisters thus tends to be difficult to be desorbed. Therefore, there is a demand for adsorbents used in canisters to have higher performance. Activated carbon is used as an adsorbent used in canisters, and has been proposed to be formed into granular shapes, powdery shapes, or honeycomb shapes (for example, Patent Literature 1).

CITATION LIST

Patent Literature

Patent Literature 1: Japanese Patent Application Laid-open No. 2013-173137

SUMMARY OF INVENTION

Technical Problem

Activated carbon fiber (or fibrous activated carbon) may be referred to as the third activated carbon in contrast with conventional powdered, granular, or pelletized activated carbon. Activated carbon fiber is said to be relatively large in specific surface area, large in adsorption capacity, and high in rate of adsorption and desorption, among different forms of activated carbon in a broad sense. However, activated carbon fiber has not been put to practical use in canisters, and research and development have not advanced sufficiently as to characteristics of activated carbon fiber suitable for practical use in canisters.

In view of the foregoing, an object of the present invention is to provide a new form of adsorbent suitable for motor vehicle canisters.

Solution to Problem

Inventors of the present invention have conducted research diligently and have found out that: in motor vehicle canisters, adsorbents need to be fixed not to be worn away due to vibration, for example; and a sheet formed of activated carbon fiber is suitable for practical use in terms of ease of handling, for example. However, the inventors have found out that demanded performance per unit volume of a canister in a motor vehicle is difficult to be achieved simply by placement of the activated carbon fiber sheet in the housing of the canister, due to the limited volume of the canister. As a result of further diligent research, the inventors have found out that an activated carbon fiber sheet suitable for motor vehicle canisters is able to be provided by the following means, and have completed the present invention.

[1] An activated carbon fiber sheet for a motor vehicle canister, comprising:
  a specific surface area ranging from 1400 to 2200 $m^2/g$;
  a pore volume ranging from 0.20 to 1.20 $cm^3/g$ for pores having pore diameters larger than 0.7 nm and equal to or smaller than 2.0 nm; and
  a sheet density ranging from 0.030 to 0.200 $g/cm^3$.

[2] The activated carbon fiber sheet for a motor vehicle canister according to the above item [1], wherein a total pore volume of the activated carbon fiber sheet ranges from 0.50 to 1.20 $cm^3/g$.

[3] The activated carbon fiber sheet for a motor vehicle canister according to the above item [1] or [2], wherein the activated carbon fiber sheet is a carbonized product of cellulosic fiber.

[4] A motor vehicle canister, comprising: the activated carbon fiber sheet for a motor vehicle canister according to any one of the above items [1] to [3].

[5] A method of producing an activated carbon fiber sheet for a motor vehicle canister, comprising:
  carbonizing and activating a raw material sheet holding one or both of a phosphoric acid-based catalyst and an organic sulfonic acid-based catalyst; and
  performing compaction such that the activated carbon fiber sheet has a density ranging from 0.030 to 0.200 $g/cm^3$.

Advantageous Effects of Invention

The present invention enables provision of an activated carbon fiber sheet that is easily handled, has high adsorption-desorption performance for a low concentration, and is suitable for canisters of motor vehicles.

Furthermore, the present invention enables provision of a motor vehicle canister having excellent adsorption-desorption performance for a low concentration.

DESCRIPTION OF EMBODIMENTS

Embodiments of the present invention will be described hereinafter. Unless otherwise specified, the phrase "ranging from AA to BB" means "being in the range of AA or more and BB or less" (where "AA" and "BB" represent arbitrary numerical values).

1. Activated Carbon Fiber Sheet for Motor Vehicle Canisters

An activated carbon fiber sheet for a motor vehicle canister of the present invention is a product in the form of a sheet made of activated carbon fiber, and is suitably used as an adsorbent to be stored in a canister mounted in a motor vehicle. (Hereinafter, the activated carbon fiber sheet for a motor vehicle canister of the present invention may simply be referred to as the activated carbon fiber sheet of the present invention.) The activated carbon fiber sheet of the present invention meets at least one condition or any combination of two or more conditions of given conditions described below.

Specific Surface Area

The lower limit of specific surface area of the activated carbon fiber sheet of the present invention is preferably 1400 m$^2$/g or more, more preferably 1500 m$^2$/g or more, and even more preferably 1600, 1700, or 1800 m$^2$/g or more.

In general, while the activated carbon fiber sheet of the present invention is preferably large in specific surface area in terms of adsorption performance, the upper limit of specific surface area for the activated carbon fiber sheet may be approximately 2200 or 2000 m$^2$/g or less.

Setting the specific surface area in the above range enables the sheet to have more excellent adsorption-desorption performance for fuel vapor.

Total Pore Volume

The lower limit of total pore volume of the activated carbon fiber sheet of the present invention is preferably 0.50 cm$^3$/g or more, more preferably 0.60 cm$^3$/g or more, and even more preferably 0.70, 0.80, or 0.85 cm$^3$/g or more.

The upper limit of total pore volume of the activated carbon fiber sheet of the present invention is preferably 1.20 cm$^3$/g or less, more preferably 1.10 cm$^3$/g or less, and even more preferably 1.00 cm$^3$/g or less.

Setting the total pore volume in the above range enables the sheet to have more excellent adsorption-desorption performance for fuel vapor.

Average Pore Diameter

The lower limit of average pore diameter of the activated carbon fiber sheet of the present invention is preferably 1.69 nm or more, more preferably 1.70 nm or more, and even more preferably 1.72, 1.75, 1.78, or 1.80 nm or more.

The upper limit of average pore diameter of the activated carbon fiber sheet of the present invention may be arbitrary, but is preferably 4.00 nm or less, more preferably 3.50 nm or less, and even more preferably 3.00 nm or less.

Setting the average pore diameter in the above range enables the sheet to have more excellent adsorption-desorption performance for fuel vapor.

Ultramicropore Volume: $V_{0.7}$

According to the present invention, the term "ultramicropore" means a pore having a pore diameter of 0.7 nm or less. (The term "pore diameter" means a diameter or width of a pore and not a radius of the pore, unless otherwise specified.)

The lower limit of ultramicropore volume of the activated carbon fiber sheet of the present invention is preferably 0.10 cm$^3$/g or more, more preferably 0.20 cm$^3$/g or more, and even more preferably 0.22 or 0.25 cm$^3$/g or more.

The upper limit of ultramicropore volume of the activated carbon fiber sheet of the present invention is preferably 0.30 cm$^3$/g or less, more preferably 0.29 cm$^3$/g or less, and even more preferably 0.28 or 0.27 cm$^3$/g or less.

Setting the ultramicropore volume in the above range enables the sheet to have more excellent adsorption-desorption performance for fuel vapor.

Micropore Volume: $V_{2.0}$

According to the present invention, the term "micropore" means a pore having a pore diameter of 2.0 nm or less.

The lower limit of micropore volume of the activated carbon fiber sheet of the present invention is preferably 0.45 cm$^3$/g or more, more preferably 0.50 cm$^3$/g or more, and even more preferably 0.55, 0.60, or 0.70 cm$^3$/g or more.

The upper limit of micropore volume of the activated carbon fiber sheet of the present invention is preferably 1.00 cm$^3$/g or less, more preferably 0.90 cm$^3$/g or less, and even more preferably 0.80 cm$^3$/g or less.

Setting the micropore volume in the above range enables the sheet to have more excellent adsorption-desorption performance for fuel vapor.

Pore Volume of Pore Having Pore Diameter Larger than 0.7 nm and Equal to or Less than 2.0 nm: $V_{0.7\text{-}2.0}$ A pore volume $V_{0.7\text{-}2.0}$ of pores having pore diameters larger than 0.7 nm and equal to or smaller than 2.0 nm is able to be determined by Equation 1 below using a value "a" of ultramicropore volume and a value "b" of micropore volume.

$$V_{0.7\text{-}2.0} = b - a \quad \text{(Equation 1)}$$

The lower limit of the pore volume $V_{0.7\text{-}2.0}$ of the pores in the activated carbon fiber sheet of the present invention, the pores having the pore diameters larger than 0.7 nm and 2.0 nm or smaller, is preferably 0.20 cm$^3$/g or more, more preferably 0.30 cm$^3$/g or more, and even more preferably 0.36, 0.40, or 0.43 cm$^3$/g or more.

The upper limit of the pore volume $V_{0.7\text{-}2.0}$ of the pores in the activated carbon fiber sheet of the present invention, the pores having the pore diameters larger than 0.7 nm and equal to or smaller than 2.0 nm, is preferably 1.20 cm$^3$/g or less, more preferably 1.00 cm$^3$/g or less, and even more preferably 0.90, 0.80, 0.75, or 0.70 cm$^3$/g or less.

Setting the pore volume $V_{0.7\text{-}2.0}$ in the above range enables the sheet to have more excellent adsorption-desorption performance for fuel vapor.

Ratio of Volume of Ultramicropores to Volume of Micropores: $R_{0.7/2.0}$

A ratio $R_{0.7/2.0}$ of the ultramicropores having pore diameters of 0.7 nm or less to the pore volume of the micropores having pore diameters of 2.0 nm or less is able to be determined by Equation 2 below using a value "a" of the ultramicropore volume and a value "b" of the micropore volume.

$$R_{0.7/2.0} = a/b \times 100 (\%) \quad \text{(Equation 2)}$$

In the activated carbon fiber sheet of the present invention, the lower limit of the ratio $R_{0.7/2.0}$ of the ultramicropore volume to the micropore volume is preferably 25% or more, more preferably 30% or more, and even more preferably 32% or more.

In the activated carbon fiber sheet of the present invention, the upper limit of the ratio $R_{0.7/2.0}$ of the ultramicropore volume to the micropore volume is preferably 60% or less, more preferably 55% or less, and even more preferably 50, 45, or 40% or less.

Setting the above-mentioned ultramicropores volume ratio $R_{0.7/2.0}$ in the above range enables the sheet to have more excellent adsorption-desorption performance for fuel vapor.

Basis Weight (Weight Per Unit Area

The lower limit of basis weight of the activated carbon fiber sheet of the present invention is preferably 30 g/m$^2$ or more, more preferably 35 g/m$^2$ or more, and even more preferably 37 or 40 g/m$^2$ or more.

The upper limit of basis weight of the activated carbon fiber sheet of the present invention is preferably 400 g/m² or less, more preferably 380 g/m² or less, and even more preferably 360, 350, 340, or 330 g/m² or less.

Setting the basis weight in the above range enables the sheet to have more excellent adsorption-desorption performance demanded for use in the canister within a range of volume of adsorbent that is able to be stored in the canister.

Sheet Thickness

The lower limit of sheet thickness of the activated carbon fiber sheet of the present invention is preferably 0.3 mm or more, more preferably 0.5 mm or more, and even more preferably 1.0 mm or 1.5 mm or more.

The upper limit of sheet thickness of the activated carbon fiber sheet of the present invention is preferably 8.0 mm or less, more preferably 7.0 mm or less, and even more preferably 4.0 mm or 3.0 mm or less.

Setting the sheet thickness in the above range enables the sheet to have more excellent adsorption-desorption performance demanded for use in the canister within a range of volume of adsorbent that is able to be stored in the canister.

Sheet Density

The lower limit of density of the activated carbon fiber sheet of the present invention is preferably 0.030 g/cm³ or more, more preferably 0.035 g/cm³ or more, and even more preferably 0.040 g/cm³ or more.

The upper limit of sheet density of the activated carbon fiber sheet of the present invention is preferably 0.200 g/cm³ or less, more preferably 0.190 g/cm³ or less, and even more preferably 0.180 or 0.170 g/cm³ or less.

Setting the sheet density in the above range enables the sheet to have more excellent adsorption-desorption performance per volume demanded for the canister within a range of volume of adsorbent that is able to be stored in the canister.

Tensile Strength (MD: Machine Direction)

The lower limit of tensile strength (MD) of the activated carbon fiber sheet of the present invention is preferably 0.05 kN/m or more and more preferably 0.06 kN/m or more.

The upper limit of tensile strength (MD) of the activated carbon fiber sheet of the present invention is not particularly limited and may be arbitrary, and may be preferably 2.50 kN/m or less, more preferably 2.40 kN/m or less, and even more preferably 2.30, 2.20, 2.10, or 2.00 kN/m or less.

Setting the tensile strength (MD) in the above range enables the sheet to have flexibility. It is therefore possible to provide an absorbent that has excellent workability, is difficult to be damaged, and is able to be easily handled in operation including placement of the adsorbent into a canister.

Tensile Strength (CD: Cross Direction)

The lower limit of tensile strength (CD) of the activated carbon fiber sheet of the present invention is preferably 0.05 kN/m or more, more preferably 0.06 kN/m or more, and even more preferably 0.07 kN/m or more.

The upper limit of tensile strength (CD) of the activated carbon fiber sheet of the present invention is not particularly limited and may be arbitrary, and may be preferably 2.50 kN/m or less, more preferably 2.40 kN/m or less, and even more preferably 2.30, 2.20, 2.10 or 2.00 kN/m or less.

Setting the tensile strength (CD) in the above range enables the sheet to have flexibility. It is therefore possible to provide an absorbent that has excellent workability, is resistant to damage, and is able to be easily handled in operation including placement of the adsorbent into a canister.

Moisture Content

The activated carbon fiber sheet of the present invention preferably has a given moisture content. For example, the lower limit of water content at 23° C. and a relative humidity of 50% is preferably 1% or more, more preferably 2% or more, and even more preferably 3% or more.

Furthermore, the upper limit of the water content at 23° C. and a relative humidity of 50% is preferably 25% or less, more preferably 22% or less, and even more preferably 15 or 10% or less.

Setting the water content in the above range under the above conditions enables the sheet to be more excellent as an adsorbent for motor vehicle canisters.

Methylene Blue Adsorption Performance

The activated carbon fiber sheet of the present invention preferably has, as an adsorbent, given methylene blue adsorption performance. The methylene blue absorption performance is able to be represented as an amount of adsorbed methylene blue per activated carbon fiber sheet weight. The methylene blue adsorption performance of the activated carbon fiber sheet of the present invention is preferably 60 ml/g or more, more preferably 70 ml/g or more, and even more preferably 80, 90, or 100 ml/g.

Iodine Adsorption Performance

The activated carbon fiber sheet of the present invention preferably has given iodine adsorption performance as an adsorbent. The iodine absorption performance is able to be represented as an amount of adsorbed iodine per activated carbon fiber sheet weight. The iodine adsorption performance of the activated carbon fiber sheet of the present invention is preferably 800 mg/g or more, more preferably 900 mg/g or more, and even more preferably 1000, 1100, or 1200 mg/g.

N-butane Adsorption-Desorption Performance

The activated carbon fiber sheet of the present invention preferably has, as an adsorbent, given n-butane adsorption-desorption performance. The n-butane adsorption-desorption performance serves as an index of adsorption-desorption performance for vapor; therefore, any adsorbent having excellent n-butane adsorption-desorption performance is suitable for use in motor vehicle canisters. The n-butane adsorption-desorption performance is able to be represented as an effective amount of adsorbed n-butane per activated carbon fiber sheet weight. The effective amount of adsorbed n-butane per activated carbon fiber sheet weight is an amount of adsorbed n-butane in adsorption that is repeated subsequently to desorption of n-butane from the adsorbent under predetermined desorption conditions after sufficient absorption breakthrough of n-butane on the adsorbent.

Preferred embodiments of the activated carbon fiber sheet of the present invention may have an effective adsorption-desorption amount of n-butane (an average of the second adsorption amount, the second desorption amount, the third adsorption amount, and the third desorption amount) that is preferably 0.380 mmol/g or more, more preferably 0.420 mmol/g or more, and even more preferably 0.450, 0.500, or 0.550 mmol/g or more. The effective adsorption-desorption amount of n-butane is determined according to a measurement method described with respect to Examples below.

Furthermore, preferable embodiments of the activated carbon fiber sheet of the present invention may have an effective adsorption-desorption ratio of n-butane that is preferably 29.0% or more, more preferably 31% or more, and even more preferably 32.0 or 34.0%. The effective adsorption-desorption ratio of n-butane is determined according to a measurement method described with respect to Examples below.

Combinations of Preferable Conditions

The activated carbon fiber sheet of the present invention meets at least one or any combination of two or more of the above-described conditions related to its physical properties or performance. Preferred examples of these combinations will be described below. The activated carbon fiber sheet of the present invention is not limited to the following combinations.

Sheet of Embodiment 1

An activated carbon fiber sheet for a motor vehicle canister satisfying the following conditions (1) to (3).

(1) Its specific surface area ranges from 1400 to 2200 $m^2/g$.

(2) Its pore volume of pores having pore diameters larger than 0.7 nm and equal to or smaller than 2.0 nm ranges from 0.20 to 1.20 $cm^3/g$.

(3) Its sheet density ranges from 0.030 to 0.200 $g/cm^3$.

Fuel vapor is a main target to be adsorbed onto the adsorbent for motor vehicle canisters. The above-described specific surface area and pore volume $V_{0.7-2.0}$ are preferably satisfied in terms of adsorption performance for fuel vapor.

Furthermore, motor vehicle canisters are limited in size and the above-mentioned condition (3) related to the sheet density is preferably satisfied for obtainment of the adsorbable amount by use of the activated carbon fiber sheet. The activated carbon fiber sheet may be formed by carbonization of a raw material that is a fiber sheet and thus generally tends to be somewhat bulky and low in density. In order to meet the above-mentioned condition (3), the activated carbon fiber sheet is subjected to treatment, such as pressure treatment, in its manufacturing process, to be compacted.

As described above, the sheet of Embodiment 1 is in a suitable form in terms of adsorption performance and adsorption capacity demanded for motor vehicle canisters.

<Sheet of Embodiment 2>

An activated carbon fiber sheet for a motor vehicle canister satisfying the following condition (4), in addition to the conditions (1) to (3) according to the Embodiment 1.

(4) Its total pore volume is 0.50 to 1.20 $cm^3/g$.

By satisfying the condition (4) as well as the conditions (1) to (3), the sheet is even more preferable in terms of obtainment of adsorption capacity demanded for the canister.

2. Canister

The activated carbon fiber sheet of the present invention is suitable as an adsorbent stored in a motor vehicle canister. That is, the present invention enables provision of a motor vehicle canister that is another embodiment.

The motor vehicle canister of the present invention has the activated carbon fiber sheet as an adsorbent. The motor vehicle canister has a structure that is not particularly limited, and may have any general structure. For example, the motor vehicle canister may be a motor vehicle canister having the following structure.

A canister including:
a housing;
an adsorbent chamber storing therein the adsorbent in the housing;
a first inlet-outlet to connect between the adsorbent chamber and an engine and allow gas to be sent into or sent out from the adsorbent chamber;
a second inlet-outlet to connect between the adsorbent chamber and a fuel tank and allow gas to be sent into or sent out from the adsorbent chamber; and
a third inlet-outlet to open in response to application of a given pressure to the third inlet-outlet from the adsorbent chamber or from outside air, connect between the adsorbent chamber and the outside air, and allow gas to be sent into or release from the adsorbent chamber.

The arrangement of these inlet-outlets is not particularly limited, but the third inlet-outlet is preferably placed at a position enabling gas to sufficiently pass through the adsorbent when the gas moves between: the third inlet-outlet and the first or second inlet-outlet. For example, according to one embodiment, the first and second inlet-outlets may be provided on a first side face of the housing and the third inlet-outlet may be provided on a second side face thereof located opposite to the first side face.

The adsorbent chamber may have more than one room. For example, the adsorbent chamber may be divided into two or more sections by partition walls. The partition walls to be used may be porous plates having gas permeability. Furthermore, an additional adsorbent room may be equipped by provision of an external second housing separately from the first housing so that the first and the second housings are connected to each other via a gas passage. If plural sections or housings are provided as described above, according to a preferred embodiment, the adsorbent or the adsorbent chamber may be provided so that adsorption capacities in these sections or housings decrease one by one from the direction of an inlet-outlet for fuel vapor (the direction of the first inlet-outlet) to the direction of an outside air opening (the direction of the second inlet-outlet). Specifically, for example, according to this preferred embodiment, a composite canister may have a main canister (a first housing) and a second canister (a second housing) that is additionally provided to the main canister and is nearer to the outside air opening than the main canister is. A high performance canister is able to be provided with reduced cost when plural sections or housings are provided as described above, the high performance canister having: a main body (a first section or a first housing) with the largest storage capacity; and a second or later section or housing with a relatively smaller storage capacity. This main body is a section or housing nearest to an inlet-outlet for fuel vapor and stores therein conventional and lower-cost activated carbon. The second or later section or housing stores therein the active carbon fiber sheet of the present invention which has excellent adsorption-desorption performance for a low concentration.

When there is more than one adsorbent chamber, fuel vapor flowing, from a preceding layer, into an adsorbent chamber nearer to the outside air opening has become lower in concentration. Therefore, the activated carbon fiber sheet of the present invention, which has high n-butane adsorption performance for a low concentration of about 0.2%, is suitable as an adsorbent to be stored in a second or later section or housing located nearer to the outside air opening.

In the case where the activated carbon fiber sheet of the present invention is used in the adsorbent chamber nearer to the outside air opening, the amount of leakage of fuel vapor upon stoppage of the motor vehicle for a long time is able to be reduced since the effective amount of adsorption-desorption by the activated carbon fiber sheet of the present invention through purging thereof is large. The activated carbon fiber sheet of the present invention is thus also suitable as an adsorbent to be used in a motor vehicle canister.

Therefore, preferred embodiments of the canister include, for example, the following embodiments.

A motor vehicle canister comprising two or more adsorbent chambers,
wherein a second or subsequent adsorbent chamber/chambers provided nearer to an outside air opening than a first adsorbent chamber provided nearest to a fuel vapor inlet-outlet stores/store therein the activated carbon fiber sheet of the present invention.

Furthermore, according to a preferred embodiment, the active carbon fiber sheet may serve as an active carbon fiber sheet for the second or subsequent adsorbent chamber/chambers in the motor vehicle canister having the two or more adsorbent chambers.

In the above embodiments, the number of the adsorbent chambers may be two or more. If the number of the adsorbent chambers is three or more, the activated carbon fiber sheet of the present invention may be stored in at least one of these adsorbent chambers that is after the second adsorbent chamber.

3. Method of Manufacturing Activated Carbon Fiber Sheet

The above-described activated carbon fiber sheet of the present invention is manufactured so as to satisfy conditions selected from the above-described given conditions. The activated carbon fiber sheet of the present invention is able to be made, for example, as follows.

One preferred embodiment of a method of manufacturing the activated carbon fiber sheet of the present invention (hereinafter, referred to as "Embodiment 1 of manufacturing method") includes:

carbonizing and activating a raw material sheet holding one or both of a phosphoric acid-based catalyst and an organic sulfonic acid-based catalyst; and performing pressure treatment so that the activated carbon fiber sheet has a density of 0.030 to 0.200 g/cm$^3$.

3-1. Preparation of Raw Material Sheet (Precursor)

Type of Fiber

Examples of fiber forming the raw material sheet include cellulosic fiber, pitch-based fiber, PAN-based fiber, phenol resin-based fiber, and preferably include cellulosic fiber.

Cellulosic Fiber

The cellulosic fiber refers to fiber composed mainly of cellulose and/or a derivative thereof. Origins of cellulose and cellulose derivatives may be any one or more of examples including chemically synthesized products, plant derived cellulose, regenerated cellulose, and cellulose produced by bacteria. Examples of the cellulosic fiber preferably used include fiber formed of a plant cellulose material obtained from plants, such as trees, and fiber formed of a long fibrous regenerated cellulose material obtained by dissolution of a plant cellulose material (such as cotton or pulp) through chemical treatment. In addition, the fiber may contain components, such as lignin and/or hemicellulose.

Examples of raw materials for the cellulosic fiber (the plant cellulose material or regenerated cellulose material) may include: plant cellulose fiber, such as cotton (such as short fiber cotton, medium fiber cotton, long fiber cotton, super long cotton, and ultra super long cotton), hemp, bamboo, kozo, mitsumata, banana, and tunicates; regenerated cellulose fiber, such as cuprammonium rayon, viscose rayon, polynosic rayon, and cellulose made from bamboo; purified cellulose fiber spun by use of organic solvent (N-methylmorpholine N-oxide); and acetate fiber, such as diacetate and triacetate. In terms of availability, a preferred one or preferred ones of these examples is/are at least one selected from cuprammonium rayon, viscose rayon, and purified cellulose fiber.

Diameters of monofilaments forming the cellulosic fiber range from 5 to 75 μm, and the density of the monofilaments ranges from 1.4 to 1.9 m$^3$/g.

Embodiments of the cellulosic fiber are not particularly limited, and according to purposes, the cellulosic fiber prepared into a form, such as raw yarn (unprocessed yarn), false twisted yarn, dyed yarn, single yarn, folded yarn, or covering yarn, may be used. When the cellulosic fiber includes two or more kinds of raw materials, the cellulosic fiber may be, for example, blended yarn or blended twisted yarn. Furthermore, the above-mentioned raw materials in various forms may be used alone or in combination of two or more as the cellulosic fiber. Non-twisted yarn is preferred among the above-mentioned raw materials for both moldability and mechanical strength of the composite material.

Fiber Sheet

A fiber sheet refers to a sheet obtained by processing of a large number of filaments of fiber into a thin and wide sheet. Fiber sheets include woven fabric, knitted fabric, and nonwoven fabric.

Methods of weaving the cellulosic fiber are not particularly limited, and a general method can be used. Weaves of the woven fabric are not particularly limited either, and any of three foundation weaves, a plain weave, a twill weave, or a satin weave, may be used.

Gaps between warp yarns and between weft yarns of the cellulosic fiber in the woven fabric formed of the cellulosic fiber range preferably from 0.1 to 0.8 mm, more preferably from 0.2 to 0.6 mm, and even more preferably from 0.25 to 0.5 mm. Furthermore, the woven fabric formed of the cellulosic fiber has a mass per unit area ranging preferably from 50 to 500 g/m$^2$ and more preferably from 100 to 400 g/m$^2$.

Setting the gaps and the mass per unit area of the cellulosic fiber and the woven fabric formed of the cellulosic fiber in the above ranges enables carbon fiber woven fabric obtained by heat treatment of the woven fabric to have excellent strength.

Methods of manufacturing the nonwoven fabric are also not particularly limited. Examples of the methods may include: a method where a fiber sheet is obtained by use of a dry method or a wet method with the above-mentioned fiber serving as a raw material and having been cut into appropriate lengths; and a method where a fiber sheet is directly obtained from a solution by use of an electrospinning method. After the nonwoven fabric is obtained, treatment, such as resin bonding, thermal bonding, spun lacing, or needle punching, may be added for the purpose of bonding the filaments of fiber together.

3-2. Catalyst

According to Embodiment 1 of manufacturing method, a catalyst is held by the raw material sheet prepared as described above. The raw material sheet holding the catalyst is carbonized and further activated by using gas, such as steam, carbon dioxide, or air gas, and a porous activated carbon fiber sheet is thus able to be obtained. Examples of the catalyst that may be used include a phosphoric acid-based catalyst and an organic sulfonic acid-based catalyst.

Phosphoric Acid-Based Catalyst

Examples of the phosphoric acid-based catalyst may include: oxyacids of phosphorus, such as phosphoric acid, metaphosphoric acid, pyrophosphoric acid, phosphorous acid, phosphoric acid, phosphorous acid, and phosphinic acid;

ammonium dihydrogen phosphate, diammonium hydrogen phosphate, triammonium phosphate, dimethyl phosphono propanamide, ammonium polyphosphate, and polyphosphonitrile chloride; and condensation products between: phosphoric acid, tetrakis (hydroxymethyl) phosphonium salt, or tris (1-aziridinyl) phosphine oxide; and urea, thiourea, melamine, guanine, cyanamide, hydrazine, dicyandiamide, or a methylol derivative of any one of these.

Preferable examples may include diammonium hydrogen phosphate. One kind of phosphoric acid-based catalysts may be used alone or two or more kinds of phosphoric acid-based catalysts may be used in combination. When the phosphoric acid-based catalyst is used in the form of an aqueous solution, the phosphoric acid-based catalyst in the aqueous solution has a concentration ranging preferably from 0.05 to 2.0 mol/L and more preferably from 0.1 to 1.0 mol/L.

Organic Sulfonic Acid-Based Catalyst

An organic compound having one or more sulfo groups can be used as the organic sulfonic acid. For example, a compound in which a sulfo group is bonded to any of various carbon skeletons of aliphatic series or aromatic series can be used. A preferred organic sulfonic acid-based catalyst has a low molecular weight in terms of handling of the catalyst.

Examples of the organic sulfonic acid-based catalyst may include compounds represented by R—$SO_3H$ where: R is a linear or branched alkyl group having 1 to 20 carbon atoms, a cycloalkyl group having 3 to 20 carbon atoms, or an aryl group having 6 to 20 carbon atoms; and each of the alkyl group, the cycloalkyl group and the aryl group optionally has a substituent of an alkyl group, a hydroxyl group, or a halogen group. Examples of the organic sulfonic acid-based catalyst may include methanesulfonic acid, ethanesulfonic acid, propanesulfonic acid, 1-hexanesulfonic acid, vinylsulfonic acid, cyclohexanesulfonic acid, p-toluenesulfonic acid, p-phenolsulfonic acid, naphthalenesulfonic acid, benzenesulfonic acid, and camphorsulfonic acid. Methanesulfonic acid may be preferably used among these examples. One kind of these organic sulfonic acid-based catalysts may be used alone, or two or more kinds of these organic sulfonic acid-based catalysts may be used in combination.

When the organic sulfonic acid is used in the form of an aqueous solution, the organic sulfonic acid in the aqueous solution has a concentration ranging preferably from 0.05 to 2.0 mol/L and more preferably from 0.1 to 1.0 mol/L.

Mixed Catalyst

The above-mentioned phosphoric acid-based catalyst and organic sulfonic acid-based catalyst may be mixed and used as a mixed catalyst. The mixing ratio may be adjusted as appropriate.

Holding of Catalyst

The catalyst is held by the raw material sheet. "Being held" means that the catalyst is kept in contact with the raw material sheet, and the catalyst may be held in various forms through, for example, adhesion, adsorption, or impregnation. Methods for the catalyst to be held by the raw material sheet are not particularly limited and include, for example, a method of immersing the raw material sheet in an aqueous solution containing the catalyst, a method of sprinkling an aqueous solution containing the catalyst over the raw material sheet, a method of causing the raw material sheet to be in contact with vapor that is the catalyst that has been vaporized, and a method of mixing the fiber of the raw material sheet into an aqueous solution containing the catalyst to make paper.

A method that can be preferably used for sufficient carbonization is a method of immersing the raw material sheet in an aqueous solution containing the catalyst to impregnate the fiber with the catalyst such that the catalyst reaches the inside of the fiber. The temperature for the immersion in the aqueous solution containing the catalyst is not particularly limited and may preferably be room temperature. The immersion time ranges preferably from 10 seconds to 120 minutes and more preferably from 20 seconds to 30 minutes. The immersion allows the fiber forming the raw material sheet to adsorb, for example, 1 to 150% by mass and preferably 5 to 60% by mass, of the catalyst. After the immersion, the raw material sheet is preferably taken out from the aqueous solution and dried. A method of drying the raw material sheet may be, for example, any of methods including a method of leaving the raw material sheet at room temperature or putting the raw material sheet in a dryer. The drying may be performed until the sample no longer changes in weight by evaporation of excess moisture after the sample is removed from the aqueous solution containing the catalyst. For example, in the drying at room temperature, the drying time for which the raw material sheet is left may be 0.5 days or more. When the raw material sheet holding the catalyst almost no longer changes in mass because of the drying, the raw material sheet holding the catalyst proceeds to the step to be carbonized.

3-3. Carbonization Treatment

After being prepared, the raw material sheet holding the catalyst is subjected to carbonization treatment. The carbonization treatment for obtainment of the activated carbon fiber sheet may be performed according to a general method of carbonizing activated carbon. The carbonization treatment according to a preferred embodiment may be performed as follows.

The carbonization treatment is usually performed under an inert gas atmosphere. According to the present invention, the inert gas atmosphere means an oxygen-free or low-oxygen atmosphere in which carbon is difficult to undergo a combustion reaction and is thus carbonized. The inert gas atmosphere may preferably be an atmosphere including gas, such as argon gas or nitrogen gas.

The raw material sheet holding the catalyst is subjected to heat treatment and carbonized in the given gas atmosphere mentioned above.

The lower limit of the heating temperature is preferably 300° C. or higher, more preferably 350° C. or higher, and even more preferably 400° C. or higher or 750° C. or higher.

The upper limit of the heating temperature is preferably 1400° C. or lower, more preferably 1300° C. or lower, and even more preferably 1200° C. or lower or 1000° C. or lower.

Setting the heating temperature as described above enables obtainment of a carbon fiber sheet with its fiber form maintained. If the heating temperature is lower than the above-mentioned lower limit, the carbon fiber may have a carbon content of 80% or less and carbonization may thus be insufficient.

The lower limit of the heat treatment time including the time for the temperature to rise is preferably 10 minutes or more, more preferably 11 minutes or more, even more preferably 12 minutes or more, and still even more preferably 30 minutes or more.

The upper limit of the heat treatment time may be optional, but is preferably 180 minutes or less, more preferably 160 minutes, and even more preferably 140 minutes or less.

By sufficiently impregnating the raw material sheet with the catalyst, setting the above-mentioned suitable heating temperature, and adjusting the heat treatment time, it is possible to adjust the degree of progress of pore formation and thus adjust the physical properties of the porous body, such as the specific surface area, the volume of the various pores, and the average pore diameter.

If the heat treatment time is shorter than the above lower limit, carbonization tends to be insufficient.

Furthermore, the heat treatment can include further reheating treatment under a given gas atmosphere after the above-described heat treatment (which may be referred to as primary heat treatment). That is, the carbonization treatment may be performed by dividing the heat treatment into two or more stages having different conditions, such as different temperatures. By performing the primary heat treatment and the reheating treatment under predetermined conditions, it may be possible to adjust the physical properties, promote the carbonization and the subsequent activation, and thus obtain an activated carbon fiber sheet having excellent adsorption and desorption properties.

3-4. Activation Treatment

The activation treatment according to the present invention may be, for example, performed continuously after the above-described heat treatment, by providing steam and keeping an appropriate activation temperature for a predetermined time, and the activated carbon fiber sheet is thereby able to be obtained.

The lower limit of the activation temperature is preferably 300° C. or higher, more preferably 350° C. or higher, and even more preferably 400 or 750° C. or higher.

On the other hand, the upper limit of the activation temperature is preferably 1400° C. or lower, more preferably 1300° C. or lower, and even more preferably 1200 or 1000° C. or lower.

When the activation treatment is performed continuously after the heat treatment, the activation temperature is preferably adjusted to a temperature that is almost the same as the heating temperature.

The lower limit of the activation time is preferably one minute or more, and more preferably five minutes or more.

The upper limit of the activation time may be optional, but is preferably 180 minutes or less, more preferably 160 minutes or less, and even more preferably 140 minutes or less, 100 minutes or less, 50 minutes or less, or 30 minutes or less.

3-5. Compaction

The activated carbon fiber sheet of the present invention preferably has a sheet density that has been adjusted. Compaction is preferably performed at any stage of the manufacturing process. The compaction may be performed, for example, by applying pressure to the sheet to increase the density.

Examples of embodiments of the compaction may include the following four types.

(1) A raw material sheet containing a binder, such as a resin, is subjected to heating and pressurization treatment, and the raw material sheet increased in density is thereby prepared and is then subjected to carbonization treatment.

(2) In a step of performing carbonization treatment, a sheet is subjected to pressurization treatment while carbonization is being performed.

(3) After carbonization treatment, a binder, such as resin, is added to an activated carbon fiber sheet and the activated carbon fiber sheet is then subjected to heating and pressurization treatment.

(4) An activated carbon fiber sheet is defibrated and then mixed with pulp or the like.

EXAMPLES

Hereinafter, the present invention will be described more specifically with reference to examples, but the technical scope of the present invention is not limited to the following examples.

Various items related to physical properties and performance of activated carbon fiber sheets and granular activated carbon were measured and evaluated by methods described below. Various numerical values defining the present invention are able to be determined by the following measurement methods and evaluation methods.

Specific Surface Area

About 30 mg of an activated carbon fiber sheet were collected, vacuum-dried at 200° C. for 20 hours, weighed, and measured using a high-precision gas/vapor adsorption amount measuring apparatus BELSORP-MAX II (MicrotracBEL Corp.). The adsorption amount of nitrogen gas at the boiling point of liquid nitrogen (77 K) was measured at a relative pressure ranging from the $10^{-8}$ order to 0.990, and an adsorption isotherm of the sample was thereby prepared. This adsorption isotherm was analyzed by the BET method for which the relative pressure range for analysis had been automatically determined under the conditions of the adsorption isotherm of Type I (ISO 9277), and the BET specific surface area per weight (unit: $m^2/g$) was determined as a specific surface area (unit: $m^2/g$).

Total Pore Volume

The total pore volume (unit: $cm^3/g$) by a one-point method was calculated based on the result at the relative pressure of 0.990 on the adsorption isotherm obtained according to the above description related to the specific surface area.

Average Pore Diameter

Calculation was performed by use of Equation 3 below.

$$\text{Average pore diameter (unit: nm)} = 4 \times \text{total pore volume} \times 10^3 / \text{specific surface area} \quad \text{(Equation 3)}$$

Ultramicropore Volume

The adsorption isotherm obtained according to the above description related to the specific surface area was analyzed using the analysis software BELMaster pertaining to the high-precision gas/vapor adsorption amount measuring apparatus BELSORP-MAX II (MicrotracBEL Corp.) through the GCMC method with the analysis settings set as follows: "Smoothing (moving average processing using one point each before and after every analyzed point of the pore distribution)," "Distribution function: No-assumption," "Definition of pore diameter: Solid and Fluid Def. Pore Size," and "Kernel: Slit-C-Adsorption." The integrated pore volume at 0.7 nm was read from the obtained pore distribution curve for adsorption, the integrated pore volume serving as the ultramicropore volume (unit: $cm^3/g$).

Micropore Volume

The adsorption isotherm obtained according to the above description related to the specific surface area was analyzed using the analysis software BELMaster pertaining to the high-precision gas/vapor adsorption amount measuring apparatus BELSORP-MAX II (MicrotracBEL Corp.) through the GCMC method with the analysis settings set as follows: "Smoothing (moving average processing using one point each before and after every analyzed point of the pore distribution)," "Distribution function: No-assumption," "Definition of pore diameter: Solid and Fluid Def. Pore Size," and "Kernel: Slit-C-Adsorption." The integrated pore volume at 2.0 nm was read from the obtained pore distribution curve for adsorption, the integrated pore volume serving as the micropore volume (unit: $cm^3/g$).

Basis Weight of Sheet

After the activated carbon fiber sheet was allowed to stand for 12 hours or more under the environment where the temperature was 23±2° C. and the relative humidity was 50±5%, the basis weight (unit: $g/m^2$) of the sheet was determined from the weight and the lengthwise and widthwise dimensions of the sheet.

Thickness of Sheet

The activated carbon fiber sheet was allowed to stand for 12 hours or more under the environment where the temperature was 23±2° C. and the relative humidity was 50±5%, and the thickness of the sheet was then measured by use of a small digital thickness measuring device FS-60DS (Daiei Kagaku Seiki Mfg. Co., Ltd.) with a load of 0.3 KPa applied to the sheet.

Density of Sheet

Calculation was performed by use of Equation 4 below.

Density of sheet (unit: g/cm³)=basis weight of sheet÷thickness of sheet÷10³     (Equation 4)

Tensile Strength (MD), Tensile Strength (CD), Elongation Percentage (MD), and Elongation Percentage (CD)

The activated carbon fiber sheet was allowed to stand for 12 hours or more under the environment where the temperature was 23±2° C. and the relative humidity was 50±5%. Test pieces (each with a width of 15 mm and a length 50 to 60 mm) were then cut out from the sheet along Machine Direction (MD) or Cross Direction (CD) orthogonal to Machine Direction (MD) so that lengths of the test pieces were respectively along Machine Direction and along Cross Direction. Using a Tensilon universal testing instrument RTG-1210 (A & D Co. Ltd.), the test pieces were pulled with the length between grips at 40 mm and the pulling speed at 100 mm/min. The tensile strength and elongation percentage were respectively calculated by Equations 5 and 6 below.

Tensile strength (unit: kN/m)=maximum load (unit: N) applied during test÷15 mm     Equation 5

Elongation percentage (unit: %)=amount of elongation at maximum load (unit: mm)÷40 mm     Equation 6

Moisture Content

The activated carbon fiber sheet was allowed to stand for 12 hours or more under the environment where the temperature was 23±2° C. and the relative humidity was 50±5%, a sample of 0.5 to 1.0 g was thereafter collected from the sheet and dried at 115±5° C. for three hours or more in a dryer, and moisture (unit: %) was determined from change in weight of the dried sample.

Methylene Blue Adsorption Performance

Measurement according to methylene blue decolorizing power (unit: ml/g) of powdered activated carbon for water supply conforming to Japan Water Works Association standards (JWWA K113) was performed, and results of the measurement were determined as the methylene blue adsorption performance (unit: ml/g).

Iodine Adsorption Performance

Measurement was performed according to iodine adsorption performance (unit: mg/g) of powdered activated carbon for water supply conforming to Japan Water Works Association standards (JWWA K113).

N-Butane Adsorption-Desorption Performance

A sample of 0.114 cm³ was collected from the activated carbon fiber sheet and was subjected to measurement using a catalyst analyzer BELCAT II (MicrotracBEL Corp.). At a test temperature of 25° C., normal butane gas diluted to a concentration of 0.2% with nitrogen gas was allowed to pass through the sample at 50 cm³/min so that adsorption breakthrough of n-butane on the sample was reached, and then desorption of n-butane was performed by allowing nitrogen gas at 23 cm³/min to pass through the sample for about 600 seconds such that the volume of nitrogen gas passed reached 2,000 times the volume of the activated carbon fiber sheet. This adsorption-desorption process was repeated three times. The average of the second adsorption amount, the second desorption amount, the third adsorption amount, and the third desorption amount was determined as the effective adsorption-desorption amount (mmol/g). The effective adsorption-desorption ratio (%) was determined by dividing the effective adsorption-desorption amount by the first adsorption amount.

Example 1

A needle-punched nonwoven fabric made of rayon fiber (at 1.7 dtex, having a fiber length of 40 mm) and having a basis weight of 300 g/m² was impregnated with 5 to 8% diammonium hydrogen phosphate aqueous solution, wrung out, and dried, to have 8 to 10% by weight of diammonium hydrogen phosphate attached to the nonwoven fabric. The obtained pretreated nonwoven fabric was heated in a nitrogen atmosphere to 900° C. in 50 minutes while being pressurized, and was kept at this temperature for 4 minutes. Continuously at that temperature, activation treatment was performed for 10 minutes in a nitrogen gas stream containing steam with a dew point of 60° C.

Example 2

A needle-punched nonwoven fabric made of rayon fiber (at 3.3 dtex, having a fiber length of 76 mm) and having a basis weight of 300 g/m² was impregnated with 5 to 8% diammonium hydrogen phosphate aqueous solution, wrung out, and dried, to have 8 to 10% by weight of diammonium hydrogen phosphate attached to the nonwoven fabric. The obtained pretreated nonwoven fabric was heated in a nitrogen atmosphere to 900° C. in 50 minutes, and was kept at this temperature for 12 minutes. Continuously at that temperature, activation treatment was performed for 10 minutes in a nitrogen gas stream containing steam with a dew point of 60° C.

Example 3

An activated carbon fiber sheet of Example 3 was prepared in the same manner as that in Example 2, except that the activation treatment time in Example 2 was changed to 23 minutes.

Comparative Example 1

An activated carbon fiber sheet of Comparative Example 1 was prepared in the same manner as that in Example 2, except that the temperature rising time to 900° C. was changed to 25 minutes, the time in which the temperature was kept at 900° C. was changed to 2 minutes, and the activation treatment time was changed to 6 minutes, from those in Example 2.

Comparative Example 2: Granular Activated Carbon

Granular activated carbon filling a commercially available canister was taken out and used as an adsorbent of Comparative Example 2.

The commercially available canister used was a canister having a product number of 77740-48220 (by Toyota Yamaguchi Parts Distributor Co., Ltd.).

Results of measurement of physical properties and performance for Examples 1 to 3 and Comparative Examples 1 and 2 are listed in Table 1.

TABLE 1

Measurement Results

| | | | Example 1 ACF | Example 2 ACF | Example 3 ACF | Comparative Example 1 ACF | Comparative Example 2 Granular activated carbon for canister | Reference Standards or Analysis Method |
|---|---|---|---|---|---|---|---|---|
| | Precursor | | Rayon fiber 1.7 dtex, 40 mm | Rayon fiber 3.3 dtex, 76 mm | | Rayon fiber 3.3 dtex, 76 mm | — | |
| $N_2$ adsorption BET analysis | Specific surface area | $m^2/g$ | 1480 | 1720 | 1980 | 1160 | 1640 | JIS K 1477 Basic physical properties related to adsorption performance |
| | Total pore volume | $cm^3/g$ | 0.64 | 0.75 | 0.91 | 0.49 | 1.29 | |
| | Average pore diameter | nm | 1.72 | 1.73 | 1.84 | 1.68 | 3.14 | |
| $N_2$ adsorption GCMC analysis | a) Ultramicropore volume[1] | $cm^3/g$ | 0.26 | 0.24 | 0.26 | 0.33 | 0.09 | Simulation analysis: Grand Canonical Monte Carlo Method |
| | b) Micropore volume[2] | $cm^3/g$ | 0.58 | 0.65 | 0.75 | 0.47 | 0.44 | |
| | b)-a) | $cm^3/g$ | 0.33 | 0.41 | 0.49 | 0.15 | 0.35 | |
| | a)/b)) | % | 44 | 37 | 35 | 69 | 20 | |
| Sheet Physical Property | Basis Weight | $g/m^2$ | 127 | 133 | 90 | 198 | — | |
| | Thickness | mm | 1.0 | 2.3 | 2.2 | 2.5 | — | |
| | Density | $g/cm^3$ | 0.126 | 0.057 | 0.041 | 0.079 | 0.26 | |
| Sheet Physical Property | Tensile strength MD | kN/m | 0.20 | 0.16 | 0.13 | 0.17 | — | |
| | Tensile strength CD | | 0.22 | 0.14 | 0.16 | 0.17 | — | |
| Moisture (23° C., 50% RH) | | % | 14 | 6 | 4 | 27 | 11 | JIS K 1477 |
| Methylene blue adsorption performance | | ml/g | 160 | 270 | 330 | 80 | 0 to 10 | JIS K 1477, JWWA K 113 |
| Iodine adsorption performance | | mg/g | 1300 | 1600 | 1700 | 1100 | 710 | JIS K 1477, JWWA K 113 |
| 0.2% n-butane adsorption-desorption performance | First adsorption amount | mmol/g | 1.619 | 1.716 | 1.803 | 1.373 | 0.749 | |
| | Effective adsorption-desorption amount[3] (Average of second and third) | | 0.571 | 0.663 | 0.752 | 0.413 | 0.211 | |
| | Effective adsorption-desorption ratio[4] | | 35.3 | 38.6 | 41.7 | 30.1 | 28.2 | |

[1] Pore diameter is 0.7 nm or less.
[2] Pore diameter is 2.0 nm or less.
[3] Average of 2nd adsorption amount, 2nd desorption amount, 3rd adsorption amount, and 3rd desorption amount
[4] (Effective adsorption-desorption amount/first adsorption amount) × 100 (%)

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An activated carbon fiber sheet for a motor vehicle canister, comprising:
   a specific surface area ranging from 1400 to 2200 $m^2/g$;
   a pore volume ranging from 0.20 to 1.20 $cm^3/g$ for pores having pore diameters larger than 0.7 nm and equal to or smaller than 2.0 nm; and
   a sheet density ranging from 0.030 to 0.200 $g/cm^3$.

2. The activated carbon fiber sheet for a motor vehicle canister according to claim 1, wherein a total pore volume of the activated carbon fiber sheet ranges from 0.50 to 1.20 $cm^3/g$.

3. The activated carbon fiber sheet for a motor vehicle canister according to claim 1, wherein the activated carbon fiber sheet is a carbonized product of cellulosic fiber.

4. The activated carbon fiber sheet for a motor vehicle canister according to claim 1, wherein the activated carbon fiber sheet is stored in the motor vehicle canister.

5. A motor vehicle canister, comprising: the activated carbon fiber sheet for a motor vehicle canister according to claim 1.

6. A motor vehicle canister according to claim 5, wherein a total pore volume of the activated carbon fiber sheet ranges from 0.50 to 1.20 $cm^3/g$.

7. A motor vehicle canister according to claim 5, wherein the activated carbon fiber sheet is a carbonized product of cellulosic fiber.

8. A method of producing an activated carbon fiber sheet for a motor vehicle canister, comprising:
   carbonizing and activating a raw material sheet having one or both of a phosphoric acid-based catalyst and an organic sulfonic acid-based catalyst; and
   performing compaction such that the activated carbon fiber sheet has a density ranging from 0.030 to 0.200 $g/cm^3$.

9. A method of producing an activated carbon fiber sheet for a motor vehicle canister according to claim 8, wherein
   the carbonizing comprises heating treatment under an inert gas atmosphere, the heating treatment being conducted for 30 minutes or more including time for temperature to rise.

* * * * *